March 16, 1965 P. W. BLACKMER 3,173,314
METHOD OF MAKING CORE DRILLS
Filed Feb. 15, 1961 3 Sheets-Sheet 1

INVENTOR.
PAUL W. BLACKMER
BY *Allan R. Redrow*
ATTORNEY

INVENTOR.
PAUL W. BLACKMER
BY Allan R Redrow

ATTORNEY

March 16, 1965 P. W. BLACKMER 3,173,314
METHOD OF MAKING CORE DRILLS
Filed Feb. 15, 1961 3 Sheets-Sheet 3

INVENTOR
PAUL W. BLACKMER
BY Allan R. Redrow
ATTORNEY

United States Patent Office 3,173,314
Patented Mar. 16, 1965

3,173,314
METHOD OF MAKING CORE DRILLS
Paul W. Blackmer, Worcester, Mass., assignor to Norton Company, Worcester, Mass., a corporation of Massachusetts
Filed Feb. 15, 1961, Ser. No. 89,450
4 Claims. (Cl. 76—108)

This invention relates to a method of making core drills.

The conventional core drill is comprised of a thin wall steel tube which forms the shank of the tool and an abrasive tip attached to one end of the tube, for example by brazing. As thus constructed, a large stock of steel tubing of various sizes must be kept on hand for machining to provide shank pieces of specified dimensions. Additionally, molds of suitable size must be kept on hand for preparing abrasive tips for attachment to the shank pieces. Such stocking, machining and molding is expensive and time consuming.

The objects of this invention are to overcome the aforesaid shortcomings of present manufacturing processes; to provide a method of making the shank and tip of integrally moldable material, of whatever size is specified; to provide a method wherein wall thickness of the shank and/or the tip and the length thereof may be varied at will without special machining operations and without substantial modification of the equipment used therefor; to eliminate the plane of weakness where the tip end is brazed or welded to the shank as in the prior art practice; and to provide a method which is adaptable to high volume production while maintaining precision which is superior to or at least, the equal of the tools made according to prior methods.

As herein illustrated, the method comprises non-yieldingly supporting a quantity of metal powder in the form of a thin wall cylindrical tube internally and at its ends with an axial section, intermediate its ends, containing abrasives, applying pressure uniformly to the entire external surface of the supported metal powder in directions to compact the wall to provide a composite structure, removing the internal and end support, sintering the composite structure to integrate the metal particles to bond to the abrasive, and grinding off the metal section at one end of the abrasive section to expose the abrasive at that end. The method also includes disposing the green composite structure before sintering on a rigid mandril having an external diameter corresponding to that of the internal diameter of the tool being made and shrinking the green structure to the dimension of a second mandril during sintering. After sintering and removal of the excess metal at the end of the abrasive section the outside diameter is ground to size. Optionally, a binder is included with the powdered metal before compaction and following sintering an impregnant may be infiltrated into the shank and/or the tip such as silver solder, copper, or the like.

The invention will now be described in greater detail with reference to the accompanying drawings wherein.

Figure 1:
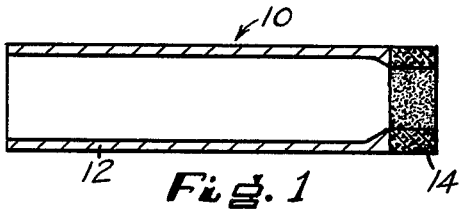
FIG. 1 is a diametrical section taken longitudinally of a core drill such as forms the subject matter of the invention.

Referring to FIG. 1 of the drawings, one form of the completed core drill structure 10, as herein shown, has a hollow thin wall sleeve-like shank 12, to one end of which is integrally attached an abrasive containing tip 14. The outside walls of the shank and tip are of the same diameter whereas the inside diameter of the tip may be smaller than that of the shank except at the junction of the shank and the tip where the shank wall is increased in thickness to coincide with that of the tip. The shank is comprised of powered metal of suitable kind and the tip of powdered metal perferably containing diamond grit abrasive. The shank and/or the tip in the completed tool may be impregnated with silver solder, cooper, copper-tin alloy or any other suitable impregnant such as a liquid resin.

Figure 2:
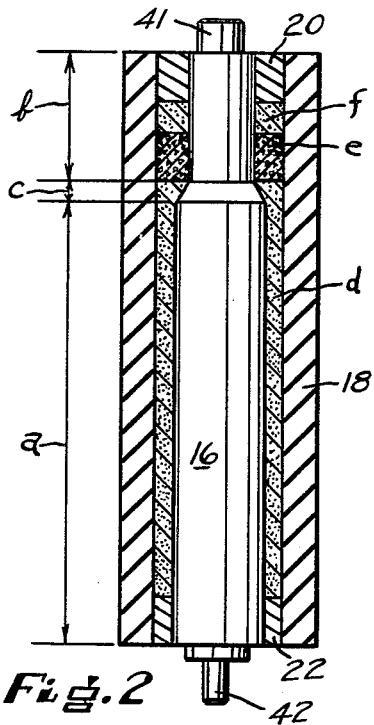
FIG. 2 is a diametrical section of a mold assembly set upright on its base and filled with powdered metal.

In its simplest form, as illustrated in FIG. 2, the apparatus for making a green core drill, from which the tool shown in FIG. 1 can be made, is comprised of a rigid arbor 16, a solid self sustaining but somewhat flexible rubber sleeve mold 18 and retaining rings 20 and 22 for holding the sleeve mold concentric with the arbor, to provide an annular space between the arbor and the sleeve mold which space is closed at its ends by said rings 20 and 22. The arbor is comprised of a rigid material such as steel and has a part $a$, having an outside diameter including an allowance for sintering shrinkage, which ultimately shrunken diameter corresponds to the inside diameter of the shank to be made, a part $b$ of smaller outside diameter, corresponding to the inside diameter of the tip, and a part $c$ which tapers in diameter from the part $a$ to the part $b$, both sections $b$ and $c$ having a shrinkage factor designed in consistence with the desired finished diameter of the tool. The sleeve mold 18 heretofore referred to as the sleeve, is of uniform inside diameter throughout its length.

The arbor is set upright with the sleeve mounted on it and held centered relative to it by the lower ring 22. The upper ring 20 is omitted to leave the upper end of the annular space open for introduction of the powdered material into the annular space. A quantity of metal powder $d$ of suitable kind is poured into the annular space equal to lengths $a$ and $c$ along the arbor 16 and up to the level of the bottom of portion $b$. As shown in FIG. 2 this provides a shank portion having an enlarged inwardly projecting shoulder at its upper end to form an enlarged junction with the tip and in the finished tool provides a relief or clearance between the inside of the shank and the resulting core of the material being drilled. The length of the shank may be varied at will by employing one or more retainer rings 22 of different axial length at the lower end of the arbor. In one form of the tool, a quantity of metal powder *e* which preferably contains diamond particles dispersed therethrough as an abrasive is now poured on top of the metal powder *d* to a depth corresponding to the axial length of the tip required. And finally a quantity of metal powder *f* is poured on top of the abrasive-containing powder to a suitable depth which may be controlled by the axial length of the retaining ring 20.

The ends of the sleeve 18 are held in resilient engagement against the retaining rings and when the assembly is placed in the press described below, the latter are held clamped with respect to the steel arbor, whereupon pressure is applied to the external surface of the sleeve 18 to compact the metal sufficiently to produce a composite structure. The tapered part *c*, provided on the mandril, is for the purpose of increasing the thickness of the wall of the shank at its junction with the abrasive tip. The metal powder *f*, added at the top of the arbor above the abrasive, together with a small ring of powdered metal added to the bottom or free end of the shank portion *d*, constitute a slight excess of metal adapted to be machined away in subsequent processing to eliminate the tapers *k* and *l*, see FIG. 4, which inherently form when the powdered metal is compressed in the press adjacent the stationary end walls formed by rings 20 and 22. By providing spacer means of suitable length, all of the slope at each end is taken up by these portions and after they are machined away the ends of the core drill may be finished to be of uniform diameter throughout which corresponds to that of the shank.

Figure 4:
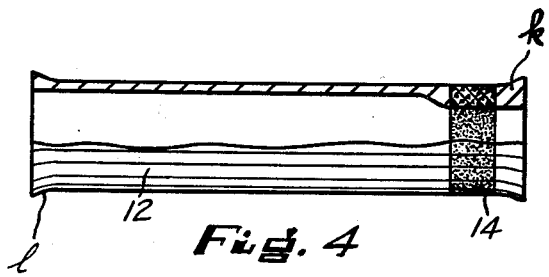
FIG. 4 is a diametrical section taken longitudinally of the integrated green core drill structure prior to removing the cap from the abrasive tip and trimming the end of the shank.

Following performance of the compaction step the sleeve 18 is removed, the retaining rings 20 and 22 are slipped off the ends of the arbor and the composite green tool structure is stripped from the arbor. The green tool form which is shown in FIG. 4, is then placed on a mandril formed of metal or graphite and having dimensions which correspond exactly to the dimensions desired for the inside of the finished core drill, whereupon the structure is sintered so as to cause it to shrink to the dimensions of the mandril and to cause the powdered metal particles to bond together to form an integrated structure having a shank 12 and tip 14 and surplus ends *k* and *l*.

The end *k* may be removed by grinding so as to expose the end surface of the abrasive tip 14, leaving the tip attached at its other end to the shank 12. The outside surfaces of the shank including end portion *l* and the tip may then be machined to size.

By following this method of manufacture, it is possible to vary the length of the shank, the diamond section, or both, by simply increasing or decreasing the length of the mold. It is also possible to produce core drills containing very thin wall thicknesses for example of from 1/32" to 1/2", merely by changing the ratio between the inner diameter of the sleeve and the diameter of the steel molding arbor. Various contours may also be imparted to the inner diameter of the core drill by suitably shaping the molding arbor.

In some circumstances it has been found desirable to impregnate the shank and/or the abrasive tip with silver solder, copper, copper-tin alloy, or some other impregnant such as a liquid resin such as a phenolic, epoxy or other type. Also, if desired, a conventional binder may be mixed with the powdered metal and/or the abrasive so that powder metal sintering need not necessarily be relied upon to form the structure although this is the preferred form of the invention.

Figure 3:
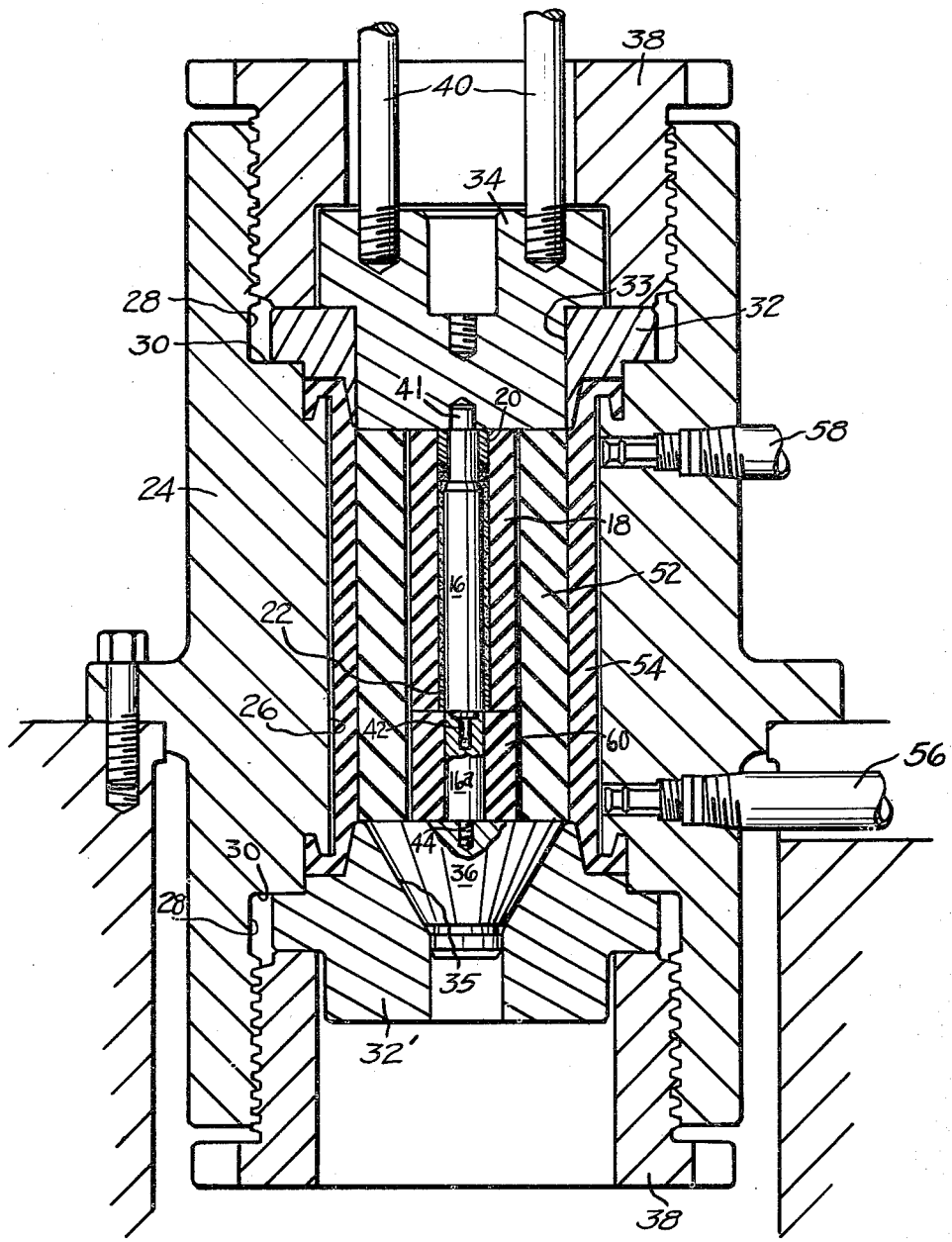
FIG. 3 is a diametrical section taken longitudinally of a hydrostatic molding apparatus used to compact the metal powder forming the core drill.
Figure 6:
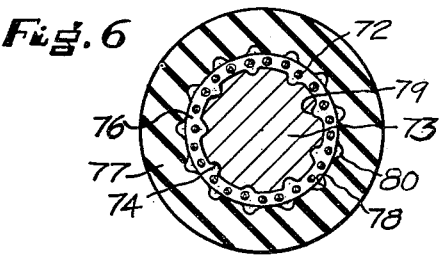
FIG. 6 is a view taken on line 6—6 of the apparatus shown in FIG. 5.

In FIG. 3 there is shown a hydrostatic press, such as may be used for applying the compacting pressure to form the green tool. The press comprises a steel shell 24 having an intermediate chamber 26 of a given diameter and end chambers 28 of larger diameter, there being a radial shoulder 30 at the junction of the ends of the intermediate chamber with each of the end chambers 28. Supporting rings 32 and 32' are disposed in each end chamber against the shoulder 30 therein, concentric with the axis of the chamber 26. The ring 32 at the head end contains a cylindrical opening 33 within which there is disposed a clamping block 34 having a cylindrical portion which fits into the opening in the ring 32 and an enlarged head which has contact with the outer face of the ring. The ring 32' at the base end has an opening 35 which is conical at its inner end within which is disposed a cone 36. The rings 32 and 32' are held in position engaged with the shoulders 30 by threaded sleeves 38 screwed into the ends of the chambers 28. Bolts 40 are screwed into the block 34 at the head end and extend axially therefrom through the sleeve 38 to facilitate removal of the block when the sleeve 38 is removed.

The assembled arbor and sleeve, with the metal powder held therebetween, by the retaining rings 20 and 22, is placed in the chamber 26 with its ends between the block 34 and the cone 36. If, as shown, the assembly is shorter than the axial length of the chamber 26, a blank arbor section 16a of suitable length may be placed between the end of the arbor 16 and the cone 36. The end of the arbor 16 adjacent the block 34 is held centered by a boss 41 integral with the arbor adapted to fit into a cooperating centering opening in the block. The opposite end of the arbor 16 has a centering pin 42 integral therewith and blank 16a is provided with a centering hole at one end to receive pin 42 and has a centering pin 44 at its opposite end for engagement with an opening in the cone 36. Surrounding the assembly there are rubber sleeves 52 and 54 and the shell 24 is connected to conduits 56 and 58 through which fluid may be introduced to the chamber 26, externally of the rubber sleeves 52 and 54, to apply pressure to the assembly for the purpose of compressing the mold sleeve 18 uniformly about the powdered metal disposed on the arbor. A rubber filler tube 60 is placed about the blank arbor sections to fill the space between them and the sleeve 54. It is obvious that if the assembly takes up the entire length of the chamber the blank 16a and the filler tube 60 may be omitted.

A pressure is built up in chamber 26 sufficient to press the metal particles into intimate contact to form a self-sustaining structure and the pressures required will, of course, vary with the type of metal being compacted and may be as little as 1000 pounds per square inch for bronze bonded drills up to as high as 20,000 pounds per square inch for drills made of bonded tungsten carbide particles.

The core drills of this invention may be made in various sizes and drill as small as 1/4" in outside diameter have been made as well as a range of drills up to 3 1/4" in diameter. The larger diameter must be designed consistent with the shrinkage normally encountered upon sintering the particular metal bond forming the shank and matrix portions of the tool and thus the limit of size is a practical one depending upon the material used and the degree of shrinkage that can be tolerated. Wall thickness can be similarly varied as desired and core drills with walls 0.032 in. in thickness up to 0.5 in. in thickness have been made. Thus the size limitations are set dependent upon the amount of truing that can be performed economically on the finished tool to eliminate any discrepancies produced during shrinkage upon firing.

While the preferred teaching makes use of diamond abrasive particles bonded in metal, the technique could be used for incorporating other abrasives in such a bond. More specifically it has been proposed to provide a composite abrasive mixture including diamond grits together with a secondary abrasive made by crushing masses of sintered tungsten carbide. Other abrasive compositions including silicon carbide or fused alumina or other well known abrasive grains may likewise be used.

In a modified form a core drill may be made as shown in FIGS. 5 to 8 wherein it is seen that the tool has a series of diamond points 70, 71, 72 supported at its tip end. These diamonds are set in a powdered metal tool by following the general teaching described above.

Figure 8:
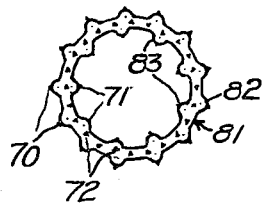
FIG. 8 is a view of the modified form of the tool taken on line 8—8 of FIG. 7.
Figure 5:
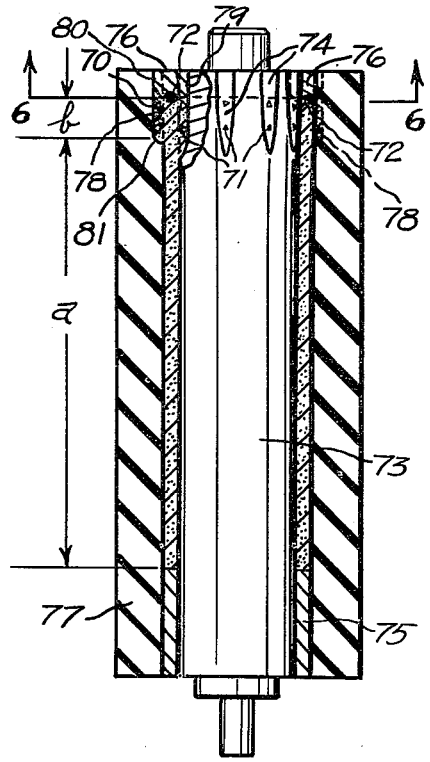
FIG. 5 is a sectional view showing a molding apparatus for forming a modified core drill structure.
Figure 7:
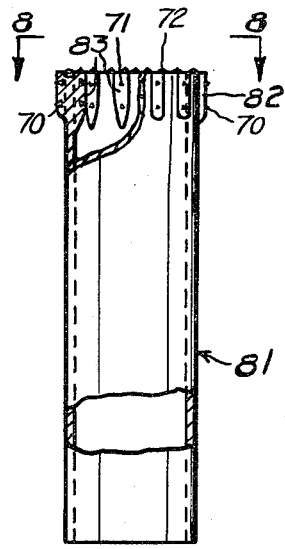
FIG. 7 is a side elevation of the modified tool made in the apparatus of FIG. 5.

To fabricate the tool shown in FIGS. 7 and 8, a differently shaped internal mandrel 73 is provided which has a plurality of grooves 74 cut into its upper end. Each of these grooves is formed of a size to contain several spaced pieces of diamonds such as 71 in each groove, the diamonds being held temporarily fixed in place by a suitable adhesive which does not contaminate the metal powder and one that vaporizes easily as the temperature of the tool is raised during sintering. It has been found that ammonium alginate serves as an ideal adhesive for this purpose. The rigid die form is closed at the bottom with a ring 75 and at its upper end with a ring 76. The outer wall 77 of the die is formed of rubber for the purpose described above.

Rubber wall 77 engages the periphery of ring 75 at the bottom end and at its upper end the internal face of wall 77 is provided with a plurality of grooves 78 each of which is adapted to receive a plurality of diamond pieces such as 70 which may be temporarily bonded thereto. The ring 76 is designed to fit onto the upper end of the mandril 73 and has a series of inwardly projecting teeth 79 to engage in and fill the grooves 74 and a similar series of teeth 80 projecting outwardly to engage in and fill grooves 78 in the rubber wall. It is evident that the rigid ring 76 serves simultaneously to close the end of the die cavity and to index the grooves 78 relative to grooves 74 when the filled die is assembled. The ring 76 may also be used to support the plurality of diamond pieces 72 temporarily, and for this purpose the series of diamond pieces 72 may be glued to the underside of ring 76.

In use, the mandril with its diamond pieces situated in grooves 74 is fitted with a ring 75 of suitable length and then the rubber wall 77 with its diamond pieces in grooves 78 is placed in position. The space between the mandril and rubber wall is then filled with a suitable powder bond and then ring 76 is fitted onto the top of the assembly so that the diamonds on its underside are embedded in the metal powder. The assembly is then subjected to the necessary pressure to compact the particular metal powder under such pressures as are well known to those skilled in the art, and thereafter the rubber wall and mandril are stripped from the green compacted mass. The diamond pieces are so firmly embedded in the compacted mass that they are easily separated from grooves 74, 78 and the underside of ring 76 and the green tool may be suitably sintered in a conventional manner to permanently bond the diamond pieces in the working end of the integrally formed tip and shank elements.

By following this form of the invention it is seen that a tool like that shown in FIG. 7 results having a shank 81 and a tip with ridges 82 and 83 integral therewith. The ridges each support a plurality of diamond pieces and a further series made up of diamond pieces 72 is disposed in the upper end of the tool as shown in FIG. 7. It is apparent that the diamond pieces are entirely supported on all sides when a tool is manufactured as here taught and these pieces may be exposed more or less by dressing the finished tool as desired.

The above examples suggest the use of bronze and tungsten carbide powders as typical of the metal bonds that may be subjected to the method here disclosed. It is obvious that any well known bonds such as iron powder, nickel powder and mixtures thereof may be used. The process may be used with other bonds such as resin and vitrified but since products made with these materials may be shaped more easily than metal bonded products, this would not be a usual procedure for these bonds.

The process for forming a core drill as here described is particularly adapted to the forming a green shape from a powdery substance, the shape being of any intricate contour, by suitably shaping mandrel 16 and cooperating sleeve 18. Patterns other than cylindrical can be worked with this procedure and the present disclosure showing the making of a core drill is by way of example only.

The apparatus described above shows an application of forming pressure to the external surface of a powdered metal sleeve surrounding a shaped mandrel. By a simple reversal of parts, the pressure could be exerted internally of the powdered metal sleeve to force it to take the form of a female die if desired.

It should be understood therefore, that the present disclosure is for the purpose of illustration only and that this invention includes all modifications and equivalents which fall within the scope of the appended claims.

I claim:

1. The method of making a hollow precision tool such as a core drill or the like having an integral abrasive tip comprising, rigidly supporting a sleeve of powdered metal along one side wall surface and at its ends with an axial section of the sleeve containing an abrasive composition, applying sufficient pressure to the other side wall surface of the powdered metal sleeve to produce a self sustaining green structure, removing the rigid side wall surface and end supports, fitting the green structure to a mandril, sintering the structure to integrate the metal particles and cause the structure to shrink to the precise dimensions of the mandril, and stripping the sintered tool from the mandril.

2. The method of making a hollow precision tool such as a core drill or the like having an integral abrasive tip comprising, rigidly supporting a sleeve of powdered metal internally and at its ends, an axial section near one end of said sleeve containing abrasive leaving metal sections at each end, applying sufficient pressure to the sleeve externally to produce a composite self sustaining structure, removing the internal and end support, placing the green composite structure on an arbor corresponding in diameter to the inside diameter of the core drill to be made, shrinking the green composite structure to the diameter of the arbor by firing it at a temperature sufficient to effect sintering of the structure, stripping the sintered structure from the arbor, grinding the metal section from the abrasive section at said one end of the sleeve to expose an end of the abrasive section and then grinding the outside diameter of the sintered section to the desired dimensions.

3. The method of making a thin walled hollow precision article of powdered metal having a tip of uniform outside diameter, comprising supporting a quantity of powdered metal sufficient to make the article between a rigid mandril having an outside surface corresponding approximately to that of the inside of the article to be made and a rubber sleeve having an inside surface corresponding approximately to the outside shape of the article, supporting axially spaced rigid retainer means corresponding approximately in thickness to the thickness of the wall of the article along said mandril providing a quantity of powdered metal to form a spacer between the tip end of the article and the retainer means at that end, applying pressure to the rubber sleeve to compact the powder of the article and the spacer, removing the compact, sintering the compact to form an integrated structure and then removing the spacer metal from the tip end of the article to expose the tip.

4. The method of making a thin walled hollow precision article of powdered metal having a uniform outside diameter from end to end, comprising supporting a quantity of powdered metal of which the article is to be made between a rigid mandril having an outside diameter corresponding approximately to the inside diameter of the article, supporting diamond points on one end of the mandril, and a rubber sleeve having an inside diameter corresponding approximately to the outside diameter of the article, supporting diamond points on the inside of the rubber sleeve at the end thereof corresponding to the diamond studded end of the mandril, confining the ends of the quantity of powdered metal with rigid retainer rings corresponding approximately in thickness to the wall of the article, supporting diamond points on the confining surface of the end ring adjacent said diamond studded rubber sleeve and mandril, applying pressure to the outside of the rubber sleeve to compact the powdered metal of the article, removing the compact with the diamond points embedded therein, sintering the compact to form an integrated structure and then truing the outside diameter of the article.

References Cited in the file of this patent

UNITED STATES PATENTS

| | | |
|---|---|---|
| 1,676,887 | Chamberlin | July 10, 1928 |
| 2,152,738 | Jeffery | Apr. 4, 1939 |
| 2,344,361 | McKeen | Mar. 14, 1944 |
| 2,373,405 | Lowit | Apr. 10, 1945 |
| 2,582,231 | Catallo | Jan. 15, 1952 |
| 2,809,808 | Catallo | Oct. 15, 1957 |
| 2,815,687 | Spang | Dec. 10, 1957 |
| 2,818,233 | Williams | Dec. 31, 1957 |
| 2,832,238 | Brinker et al. | Apr. 29, 1958 |
| 2,846,902 | Cowley | Aug. 12, 1958 |